US009628296B2

(12) United States Patent
Libin et al.

(10) Patent No.: US 9,628,296 B2
(45) Date of Patent: Apr. 18, 2017

(54) FAST MOBILE MAIL WITH CONTEXT INDICATORS

(71) Applicant: Evernote Corporation, Redwood City, CA (US)

(72) Inventors: Phil Libin, San Josee, CA (US); Keith Lang, Austin, TX (US); Richard M. Warwick, Austin, TX (US); Christopher Hinkle, Austin, TX (US); Juan Carlos Jimenez, Cedar Park, TX (US); Ken Ryall, Austin, TX (US); Matthew Armendariz, Austin, TX (US)

(73) Assignee: EVERNOTE CORPORATION, Redwood City, CA (US)

( * ) Notice: Subject to any disclaimer, the term of this patent is extended or adjusted under 35 U.S.C. 154(b) by 598 days.

(21) Appl. No.: 13/689,932

(22) Filed: Nov. 30, 2012

(65) Prior Publication Data
US 2013/0173727 A1 Jul. 4, 2013

Related U.S. Application Data

(60) Provisional application No. 61/580,907, filed on Dec. 28, 2011, provisional application No. 61/596,411, (Continued)

(51) Int. Cl.
G06F 15/16 (2006.01)
H04L 12/58 (2006.01)
(Continued)

(52) U.S. Cl.
CPC ......... H04L 12/584 (2013.01); G06Q 10/107 (2013.01); H04L 51/063 (2013.01);
(Continued)

(58) Field of Classification Search
CPC ........ H04I 12/584; H04L 51/10; H04L 51/18; H04L 67/107; H04L 67/18; H04L 17/241; H04L 51/063; H04L 51/08; G06F 17/241
See application file for complete search history.

(56) References Cited

U.S. PATENT DOCUMENTS 6,839,736 B1    1/2005  Kajita et al.
7,506,262 B2 *  3/2009  Gupta et al. ............... 715/751
(Continued)

FOREIGN PATENT DOCUMENTS

CN    1042254 A    5/1990
CN    1975715 A    6/2007
(Continued)

Primary Examiner — Djenane Bayard
(74) Attorney, Agent, or Firm — Morgan, Lewis & Bockius LLP

(57) ABSTRACT

Facilitating replying to received email messages includes presenting a selectable set of fast reply tokens that correspond to snippets of multimedia content, providing a mechanism to superimpose a selected subset of the fast reply tokens on to different portions of the received email message to compose an annotated email messages, wherein the fast reply tokens are separate from any reply email text, and sending the annotated email message. The fast reply tokens may include action icons, status icons, emoticons, emojis, expressive elements, clip art, highlighters, geometric shapes, arrows, short tunes, audio clips, video clips, abbreviated standard texts, and freehand notes. Facilitating replying to received email messages may also include providing cultural adaptations and localization of fast reply tokens based on a setting provided by a recipient of the annotated email message.

32 Claims, 13 Drawing Sheets

Related U.S. Application Data filed on Feb. 8, 2012, provisional application No. 61/624,853, filed on Apr. 16, 2012.

(51) Int. Cl.
  *G06Q 10/10* (2012.01)
  *G06F 17/24* (2006.01)
(52) U.S. Cl.
  CPC .............. *H04L 51/10* (2013.01); *G06F 17/24* (2013.01); *H04L 51/18* (2013.01)

(56) References Cited

U.S. PATENT DOCUMENTS

| | | |
|---|---|---|
| 8,037,146 B2 | 10/2011 | Carr et al. |
| 2002/0196916 A1 | 12/2002 | Okada et al. |
| 2004/0205653 A1 | 10/2004 | Hadfield et al. |
| 2005/0086314 A1 | 4/2005 | Zdepski |
| 2005/0234943 A1 | 10/2005 | Clarke |
| 2007/0055926 A1* | 3/2007 | Christiansen et al. ........ 715/512 |
| 2007/0130126 A1 | 6/2007 | Lucovsky et al. |
| 2007/0201634 A1* | 8/2007 | Bonnaud et al. .......... 379/88.13 |
| 2008/0086695 A1 | 4/2008 | Oral |
| 2008/0104503 A1* | 5/2008 | Beall et al. .................... 715/233 |
| 2009/0125597 A1* | 5/2009 | Carr et al. .................... 709/206 |
| 2009/0210778 A1 | 8/2009 | Kulas et al. |
| 2009/0319633 A1 | 12/2009 | Adams et al. |
| 2010/0036917 A1 | 2/2010 | Mccaffrey et al. |
| 2010/0151889 A1* | 6/2010 | Chen et al. .................... 455/466 |
| 2010/0172287 A1 | 7/2010 | Krieter |
| 2011/0151842 A1* | 6/2011 | Olincy et al. .............. 455/414.1 |
| 2011/0184721 A1 | 7/2011 | Subramanian et al. |
| 2011/0185024 A1 | 7/2011 | Ramarao et al. |
| 2011/0239102 A1* | 9/2011 | Tanaka et al. ................ 715/230 |
| 2011/0281544 A1 | 11/2011 | Pallota |
| 2012/0059811 A1 | 3/2012 | Libin et al. |
| 2012/0060098 A1 | 3/2012 | Libin et al. |
| 2012/0191728 A1 | 7/2012 | Libin et al. |
| 2013/0212463 A1 | 8/2013 | Pachikov et al. |

FOREIGN PATENT DOCUMENTS

| | | |
|---|---|---|
| CN | 101030368 A | 9/2007 |
| CN | 101430676 A | 5/2009 |
| WO | WO 2007/098421 A2 | 8/2007 |

* cited by examiner

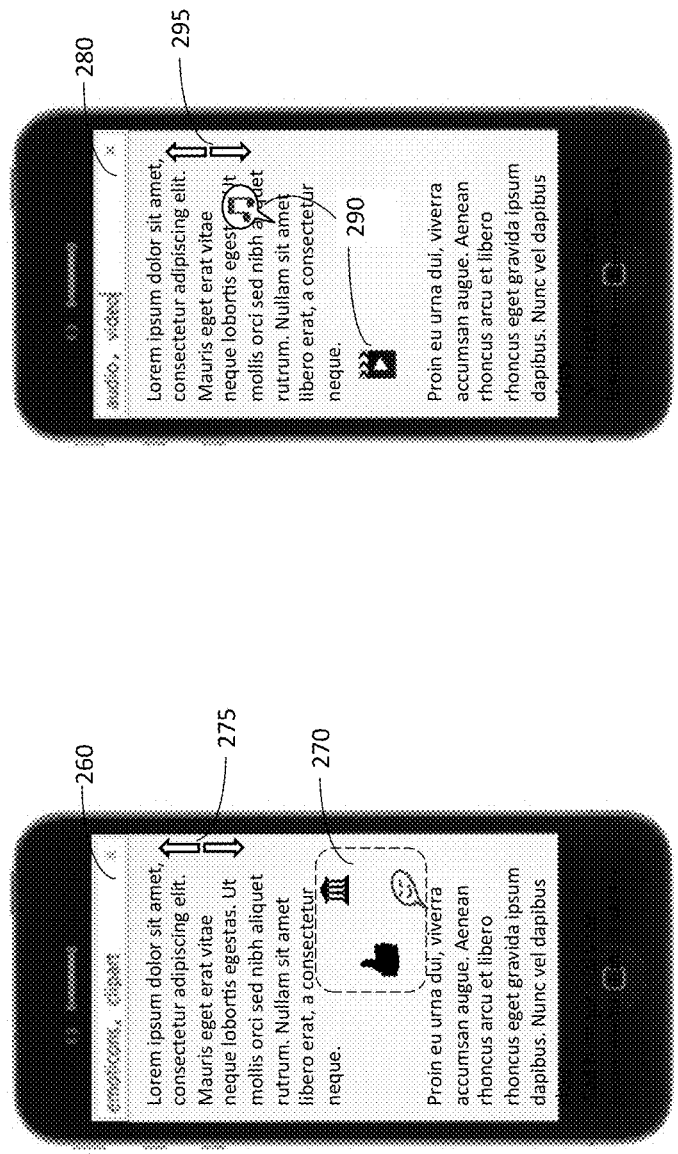

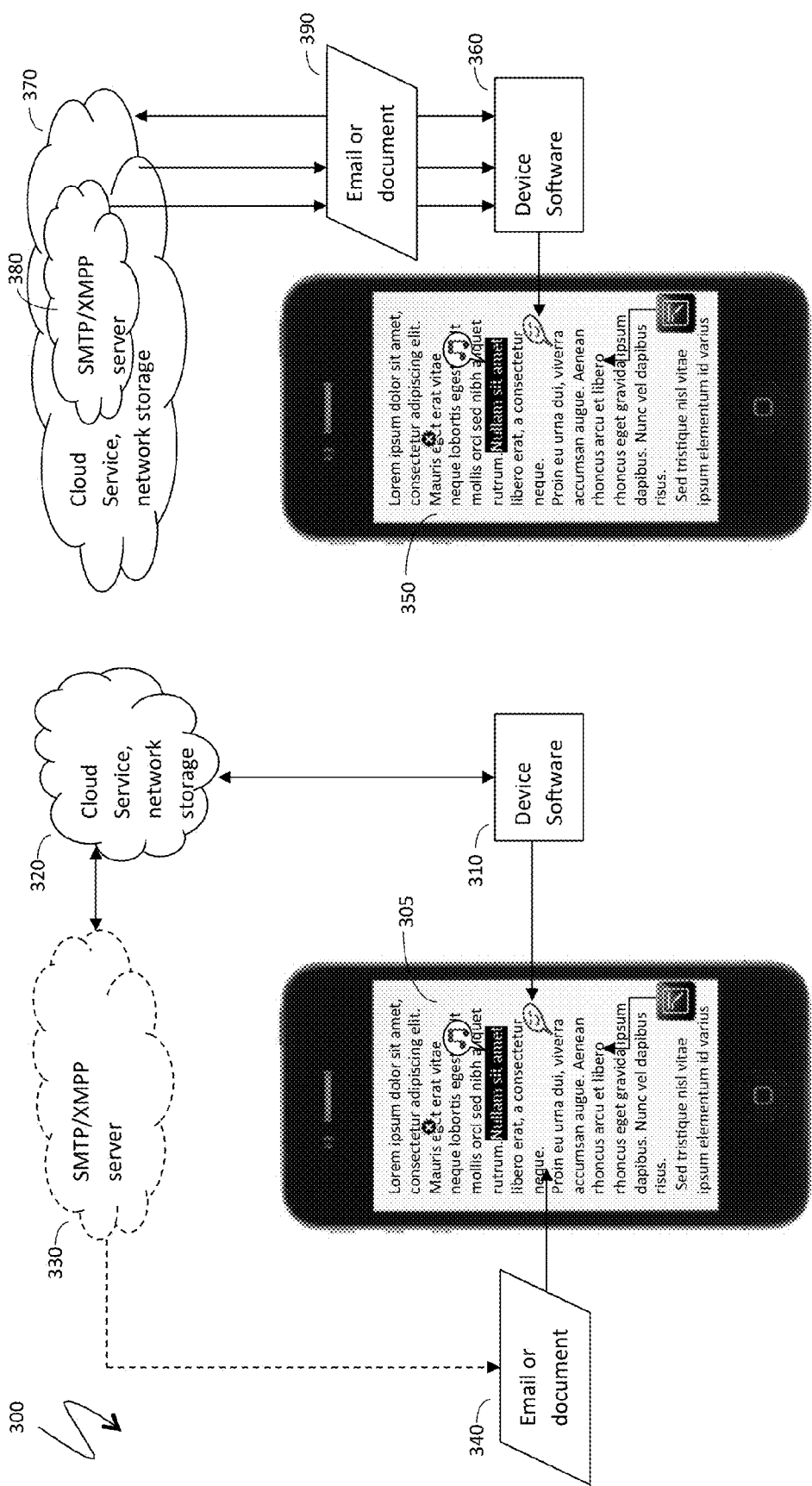

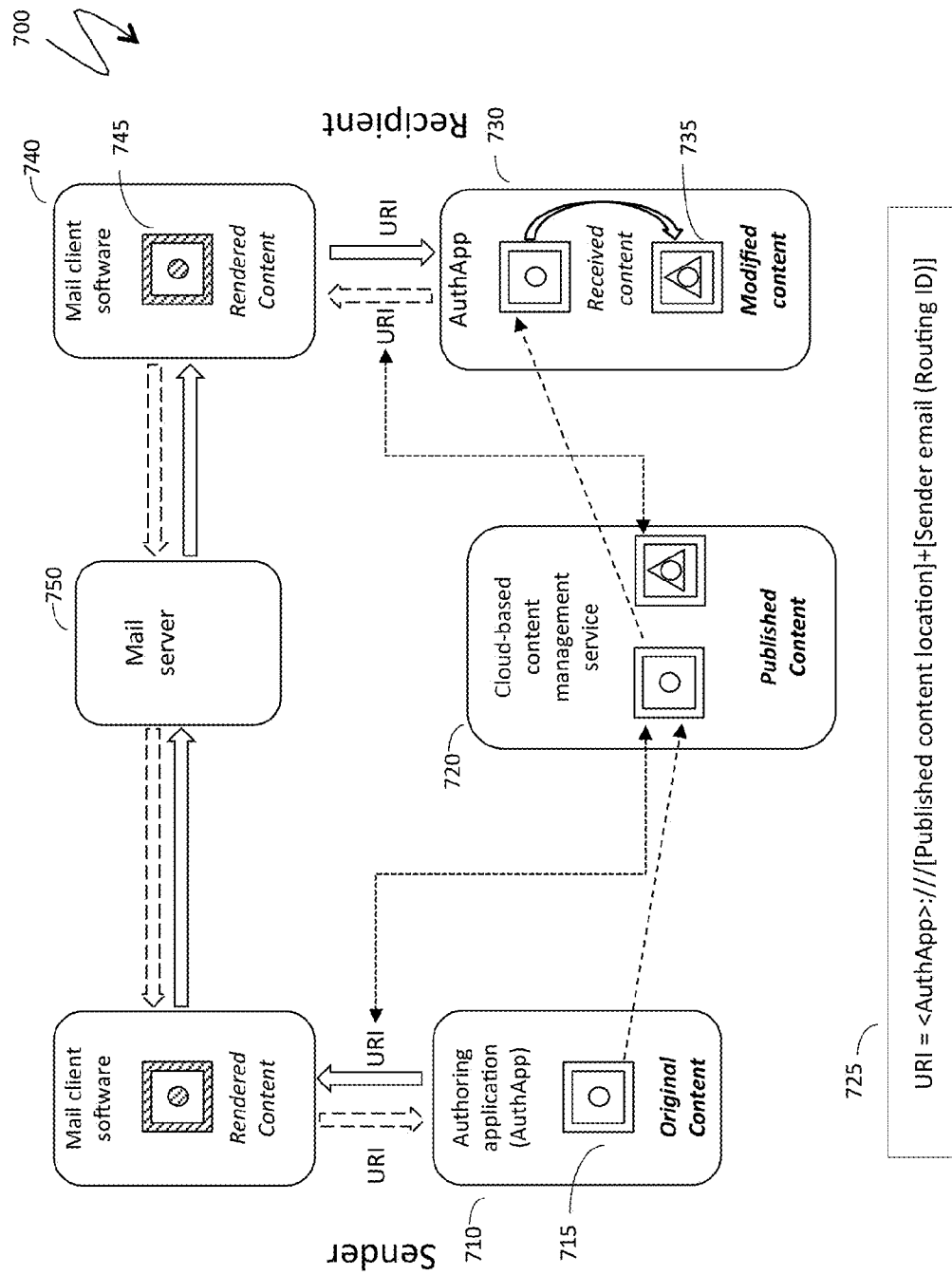

FAST MOBILE MAIL WITH CONTEXT INDICATORS

CROSS-REFERENCE TO RELATED APPLICATIONS

This application claims priority to U.S. Prov. App. No. 61/580,907, filed Dec. 28, 2011, and entitled "FAST MOBILE MAIL," which is incorporated herein by reference, and claims priority to U.S. Prov. App. No. 61/596,411, filed Feb. 8, 2012, and entitled "FAST MOBILE MAIL WITH CONTEXT INDICATORS," which is incorporated herein by reference, and claims priority to U.S. Prov. App. No. 61/624,853, filed Apr. 16, 2012, and entitled "METHOD FOR ROUTING AND ACCESSING CONTENT PROVIDED BY AN AUTHORING APPLICATION," which is incorporated herein by reference.

TECHNICAL FIELD

This application relates to the fields of mobile Internet communications and presentation and editing of multimedia information.

BACKGROUND OF THE INVENTION

Electronic mail remains one of the most popular Internet applications, comparable with online searching. According to industry estimates, there have been about 3.3 billion email accounts by 2012 used by approximately 2 billion users and expected to grow to 4.3 billion accounts by the end of 2016. Over 92% of the adult US population has been using email and 66% of those email users do so as part of their typical day. In a broad picture, email viewing and sending is split between three large platforms: desktop, web, and mobile. Mobile email is quickly evolving into a dominant communication platform. In mid-2011, desktop platforms were prevailing with the split 53% desktop, 29% web, 18% mobile. By February 2012, the three platforms have converged and had approximately equal market share; starting in April 2012, mobile email has overtaken other platforms, with 38% of emails opened on smartphones, tablets and other mobile devices. According to some estimates, within a couple years, mobile email viewing will account for more than 50% of the overall volume.

Email usage on mobile devices is different from desktop and web mail in many respects. While viewing and navigating email messages on smartphones and tablets with a respectable screen size is, for the most part, almost as easy and convenient as on the desktop, responding to emails on devices with on-screen keyboards can be a difficult and tiring job, especially when users are on the go. This puts a strain on some of the most active users of mobile email: managers, journalists and other categories of workers who receive hundreds or even thousands of messages daily and need to respond quickly. Some of the challenges of responding to an email message on a mobile device include: separating fragments of the original text from the rest of mail for commenting; typing comments and edits on soft keyboards; text formatting; adding annotations; identifying annotated materials as part of the original documents, etc. Additionally, existing techniques for transmitting rich content via email significantly limits efficient response. For example, when an email includes attachments opened for editing and markup in non-email applications, the attachments may lack routing information which would allow automatic sending of edited and annotated fragments of the attachment to all or some recipients directly from the authoring application that has opened the attachment. This may cause additional work of saving annotated fragments of rich content and re-attaching the fragments to reply emails, which complicates the workflow and presents additional challenges to both the author/sender and the recipients.

Accordingly, it is desirable to develop a mechanism for fast and seamless email reply on mobile devices with adequate routing of rich content and its annotated fragments.

SUMMARY OF THE INVENTION

According to the system described herein, facilitating replying to received email messages includes presenting a selectable set of fast reply tokens that correspond to snippets of multimedia content, providing a mechanism to superimpose a selected subset of the fast reply tokens on to different portions of the received email message to compose an annotated email messages, wherein the fast reply tokens are separate from any reply email text, and sending the annotated email message. The fast reply tokens may include action icons, status icons, emoticons, emojis, expressive elements, clip art, highlighters, geometric shapes, arrows, short tunes, audio clips, video clips, abbreviated standard texts, and freehand notes. Facilitating replying to received email messages may also include providing cultural adaptations and localization of fast reply tokens based on a setting provided by a recipient of the annotated email message. The mechanism to superimpose the fast reply tokens may include dragging each of a selected one of the fast reply tokens on to a corresponding portion of the annotated email message. Facilitating replying to received email messages may also include superimposing a progressing scrolling bar for fast reply tokens on to the one of the received email messages to facilitate efficient navigation therethrough. Facilitating replying to received email messages may also include providing a search bar for searching the fast reply tokens by category. Facilitating replying to received email messages may also include automatically restricting a user to sending only particular types of input in response to a user being in a particular setting. Facilitating replying to received email messages may also include automatically restricting a user to receiving only particular types of input in response to a user being in a particular setting. A user may be restricted to sending and receiving audio-only input in response to the user being in a moving automobile. Facilitating replying to received email messages may also include automatically converting a message from a first type of input to one of the particular types of input, wherein the first type of input is not one of the particular types of input. Facilitating replying to received email messages may also include determining an overall tone of the annotated email message based on the fast reply tokens superimposed on to the annotated email message and providing to a recipient an indication of the overall tone of the annotated email message. Facilitating replying to received email messages may also include including context information with at least some of the fast reply tokens superimposed on to the annotated email message, wherein the context information includes portions of source documents associated with at least some of the fast reply tokens. Each of the portions of source documents may include location information indicating a location within the document for the corresponding portion. The location information may indicate a page and a position on the page for the corresponding portion. The position on the page may be descriptive or may be indicated using a graphical matrix.

According further to the system described herein, computer software, provided in a non-transitory computer readable medium, facilitates replying to received email messages. The software includes executable code that presents a selectable set of fast reply tokens that correspond to snippets of multimedia content, executable code that superimposes a selected subset of the fast reply tokens on to different portions of the received email message to compose an annotated email messages, where the fast reply tokens are separate from any reply email text, and executable code that sends the annotated email message. The fast reply tokens may include action icons, status icons, emoticons, emojis, expressive elements, clip art, highlighters, geometric shapes, arrows, short tunes, audio clips, video clips, abbreviated standard texts, and freehand notes. The software may further include executable code that provides cultural adaptations and localization of fast reply tokens based on a setting provided by a recipient of the annotated email message. The mechanism to superimpose the fast reply tokens may include dragging each of a selected one of the fast reply tokens on to a corresponding portion of the annotated email message. The software may further include executable code that superimposes a progressing scrolling bar for fast reply tokens on to the one of the received email messages to facilitate efficient navigation therethrough. The software may further include executable code that provides a search bar for searching the fast reply tokens by category. The software may further include executable code that automatically restricts a user to sending only particular types of input in response to a user being in a particular setting. The software may further include executable code that automatically restricts a user to receiving only particular types of input in response to a user being in a particular setting. A user may be restricted to sending and receiving audio-only input in response to the user being in a moving automobile. The software may further include executable code that automatically converts a message from a first type of input to one of the particular types of input, wherein the first type of input is not one of the particular types of input. The software may further include executable code that determines an overall tone of the annotated email message based on the fast reply tokens superimposed on to the annotated email message and executable code that provides to a recipient an indication of the overall tone of the annotated email message. The software may further include executable code that includes context information with at least some of the fast reply tokens superimposed on to the annotated email message, wherein the context information includes portions of source documents associated with at least some of the fast reply tokens. Each of the portions of source documents may include location information indicating a location within the document for the corresponding portion. The location information may indicate a page and a position on the page for the corresponding portion. The position on the page may be descriptive or may be indicated using a graphical matrix.

According further to the system described herein, sharing modifications of a document among a plurality of authors includes publishing the document using a service that is accessible by at least some of the authors and propagating modifications by a first one of the authors to other ones of the authors by sending change information to the other one of the authors, wherein the change information includes a pointer to the document, an indication of the modifications, and an identification of the first one of the authors and wherein the change information does not include the document. The service may be a cloud service. Change information may be sent using email. The identification of the first one of the authors may include a routing ID of the first one of the authors, where the routing ID facilitates locating the first one of the authors on the Internet. The routing ID may be an email address of the first one of the authors. Modifications to the document may be performed using an authoring application. Less than all of the plurality of authors may have the authoring application. The document may be viewable by all of the authors using an email client. Modifications to the document may be performed using an authoring application. The change information may identify the authoring application. Sharing modifications of a document among a plurality of authors may also include a second one of the authors, different from the first one of the authors, performing additional modifications to the document and propagating the additional modifications by the second one of the authors to other ones of the authors by sending supplemented change information to the other one of the authors, where the supplemented change information appends to the change information an indication of the modifications and an identification of the second one of the authors. The change information may include an indication of particular modifications made by each of the authors. Sharing modifications of a document among a plurality of authors may include supplementing the change information with identification information for additional recipients, where at least one of the additional recipients does not perform any modifications to the document.

According further to the system described herein, computer software, provided in a non-transitory computer readable medium, shares modifications of a document among a plurality of authors. The software includes executable code that publishes the document using a service that is accessible by at least some of the authors and executable code that propagates modifications by a first one of the authors to other ones of the authors by sending change information to the other one of the authors, where the change information includes a pointer to the document, an indication of the modifications, and an identification of the first one of the authors and where the change information does not include the document. The service may be a cloud service. Change information may be sent using email. The identification of the first one of the authors may include a routing ID of the first one of the authors, where the routing ID facilitates locating the first one of the authors on the Internet. The routing ID may be an email address of the first one of the authors. Modifications to the document may be performed using an authoring application. Less than all of the plurality of authors may have the authoring application. The document may be viewable by all of the authors using an email client. Modifications to the document may be performed using an authoring application. The change information may identify the authoring application. The software may also include executable code that propagates additional modifications by a second one of the authors to other ones of the authors by sending supplemented change information to the other one of the authors, where the supplemented change information appends to the change information an indication of the modifications and an identification of the second one of the authors. The change information may include an indication of particular modifications made by each of the authors. The computer software may also include executable code that supplements the change information with identification information for additional recipients, where at least one of the additional recipients does not perform any modifications to the document.

Replying to email on a mobile device includes a responder using fast reply tokens, which represent snippets of multimedia content overlaid upon the original text and in line with the previously added fast reply tokens. Fast reply tokens may be positional or generic and may include: commonly accepted action and status icons and symbols; expressive elements and representations of mood, such as emoticons and/or emojis, clipart from pre-compiled or other available libraries, highlighters, geometric shapes for annotations, arrows, connectors, pointers and other markup and annotation elements, short tunes, audio and video clips that may be pre-recorded and retrieved from a library or recorded by the responder in the process of replying, abbreviated standard texts, freehand writing and drawing, and/or small fragments of typed text.

Fast reply tokens may be applied to selected elements in the original email such as words, phrases, paragraphs of text, images, etc. Alternatively, fast reply tokens may pertain to the whole message. Fast reply tokens may be made available either inline, with the text flow of the original email message, for example, within callouts associated with the selected elements or the tokens may be inserted into an automatically or manually created blank space in the body of an email. Tokens may be added to an email response using tap-and-select user interface (UI), multi-touch gestures or other UI methods. In one embodiment, a dedicated multi-touch gesture (such as swiping) may invoke the token toolbox for user choice.

The appearance and features of a fast mobile mail message received by a user may differ depending on the device to which the message arrives. Message adaptation and conversion occurs on the server and is part of the fast mobile mail cloud service which stores user profiles and in particular profiles and desired presentation modes for each device owned by the user. Message adaptation may include conversion of fast reply tokens between diverse media types. In an embodiment, if the user drives a car and receives a fast mobile mail on a smartphone by downloading it from the server, the system may automatically detect the smartphone as a receiving device and the user driving status, whether the latter has been previously set by the user or automatically detected by the system via interaction of smartphone with the built-in car electronics. Under such conditions, the system may transmit the fast mobile mail message with all visual elements converted into their audio representations, so that the user does not have to look at a visual display while driving and will still get the most of message content. Alternatively, a user having hearing issues or receiving a fast mobile mail message in a noisy environment may pre-configure fast mobile mail so that all audio elements will be converted by the fast mobile mail service into their visual equivalents. In another embodiment, a user who receives a fast mobile mail message on a device without video capabilities may pre-configure the personal fast mobile mail account so that video fast reply tokens are disabled or replaced them with one or a series of characteristic static screens that can be viewed by the user.

The fast mobile mail may offer cultural adaptation, such as automatic translation of the text to deliver text snippets to each recipient in the preferred language, filtering, on user demand, suspicious textual, graphical and audio content arriving to the user, depending on cultural preferences, transcribing visual fast reply tokens in accordance with language and cultural settings, for example, converting emoticons into the corresponding emoji during an English-to-Japanese translation of a fast mobile mail message, and vice versa, and/or delivering contact info to each recipient in the desired language and with the appropriate recipient country specific formatting of contact fields.

Fast mobile mail may include device software for a variety of mobile platforms and cloud service. In an embodiment, fast mobile mail may be limited to the device software, which may be designed as a plug-in/add-on software application to existing mobile mail client software applications. The cloud service associated with the fast mobile mail may be a part of broader online note-taking or personal content management services such as Evernote developed by Evernote Corporation of Redwood City, Calif., USA. The cloud service may securely store information about registered users and profiles and preferences of users and may also store fast mobile mail messages for push or pull access by users. In one embodiment, the cloud service includes (or communicates with) third party mail and/or instant messaging servers (such as SMTP or XMPP servers), document storage systems, etc. In another embodiment, the device software interacts with third party mail and instant messaging software on its own. Hybrid interaction with the third party mail and instant messaging software is also possible.

The device software may work offline, disconnected from the associated cloud service; online—permanently connected with the service, and partially online when connection to the cloud service is available periodically. Functions of fast mobile mail may be distributed between device software and cloud service, depending on the connection scenario and parameters.

Upon completion by a responder of a fast mobile mail message, device software and/or cloud service may analyze fast reply tokens and attempt to build an abstract of the message, such as defining an overall mood of the communication by counting fast reply tokens with emotionally meaningful content, including such tokens as emoticons and standard tunes, emphatic words in text snippets, etc. If a prevailing mood (tone) of a fast mobile mail message can be recovered with a sufficient certainty then the mobile software and/or cloud service may add a visual representation, an audio representation or both of the abstract in the form of a brief tune, image, animation or other display consistent with the mood of the message and replayed to each recipient (who has appropriately configured fast mobile mail to receive such introductions) prior to displaying the message. Similar to fast reply tokens, abstracts may be culturally adapted, as explained elsewhere herein.

When a fast mobile mail message, authored by a user with device software installed, arrives to a recipient who also has device software installed, the recipient can view the full message and replay all fast reply tokens, subject only to the capabilities of the receiving device. However, when a recipient does not have the device software installed and receives a fast mobile mail message via regular email, the message may be displayed in an adapted format, such as a standard HTML or an image rendered with certain layout and disposition of fast reply tokens. In this case, full multimedia copy of the fast mobile mail message may be stored at the cloud service and the adapted message delivered to the recipient may include a link to the full copy which the recipient may use after installing the device software.

The device software may provide a set of multimedia methods for authoring mail replies, editing documents, communicating with the cloud service and, when necessary, with other third party software and services, including traditional email software. Functions of the device software may include one or more of the following:

Rendering, displaying and navigating incoming mail message on the device screen.

Attaching fast reply tokens to words or other semantic elements inline, within the text flow, or adding free space for replies.

Quick navigation of fast mobile mail message, such as scanning fast reply tokens by entry time, spatial arrangement, category of content, etc.

Sending fast mobile mail reply to the cloud service (when connected) for subsequent distribution to recipients and storage in the cloud service, as explained elsewhere herein; also, synchronizing local storage with the device.

Receiving fast mobile mail reply from another user by communicating with the cloud service or other content distribution source.

Receiving, rendering and playing an abstract or introductory tune to a reply received from another user, according to receiving user's profile and preferences.

Search in fast mobile mail message contents by different characteristics.

The cloud service may provide a set of mechanisms for accessing, directing and controlling the content of original documents and replies, controlling device software and delivering fast mobile mail messages. Functions of the cloud service may include one or more of the following:

Storing user accounts, profiles, settings, and sending/receiving preferences adapted to user devices, languages, location, cultural background, disposition, and other situational parameters.

Keeping and employing sets of dictionaries and lists used for situational and cultural adaptation and conversion (transcoding) of fast reply tokens.

Receiving original email message or document from a mail server or other source and sending the message to the device software for display and reply on a user device. It should be noted that, alternatively, the email message/document can be delivered to the user device directly by a third party mail or other content distribution service and opened in the device software serving as a plugin to third party software, without participation of the cloud service.

Synchronizing user preferences and settings with each user device, which may be subsequently employed by the device software running on that device.

Updating device software when new versions are available.

Receiving and storing copies of the original fast mobile mail messages from the device software and of the adapted copies built in accordance with recipient preferences and their device capabilities; generating links to access stored copies.

Customizing fast mobile mail messages and copies of edited documents according to recipient preferences and their device capabilities.

Analyzing fast mobile mail messages and creating abstracts in the form of introductory or supplementary tunes or visuals.

Sending replies and edited documents to recipients in custom formats using embedded mail server or communicating with third party mailing systems and other content distribution means.

Displaying adapted version of replies and edited documents to users upon request in a web browser. This option applies to recipients whose principal mail client cannot render fast mobile mail messages and who don't have device software installed on their devices.

It should be noted that carrying out the above techniques may require different degrees of connectivity between the device software, the cloud service and third party email and other content distribution services. For example, sending a fast mobile mail message from a user device may require instant connection and transmission of content, while synchronization or changing of a user profile may require only periodic connection between with the cloud service. In the event when a user device remains offline, i.e. disconnected from the cloud service for prolonged periods of time, the device software may partially duplicate some of the functions of the cloud service and synchronize the changes with the cloud service once the connection becomes available.

Fast mobile mail messages may include annotated snippets of documents attached to the original email messages or otherwise delivered to a responder. In the event that document formatting has a fixed pagination (for example, a PDF document) it may be desirable to provide to recipients a detailed reference to snippet location in the document to facilitate understanding the context of the annotations. Since a snippet can be significantly smaller than the page it is extracted from, a referencing mechanism may be expanded to the sub-page level. A proposed technique for referencing portions of documents with fixed pagination includes context indicators, which are a visual reference attached to an annotated snippet in the form of a footer, header, callout, overlay or other visible element, which includes the document name (which may be a more generic URI—Unified Resource Identifier), the page number within the document, and a graphical matrix showing parts of the page where the snipped location(s) is (are) highlighted. Thus, a 3×3 matrix may indicate nine parts of the page from the bottom left part to the top right part, and a highlighted matrix element within the context indicator may indicate, for example, snippet location in the right bottom part of the page or two highlighted elements may place a snippet across the middle left and the top left parts. Alternatively, details of snippet location on the page may be represented textually; thus, in the previous example, instead of displaying a 3×3 matrix and highlighting different elements of the matrix, the context indicator may augment the document and page reference with the words "top right of the page" or "middle left and top left of the page".

As explained elsewhere herein, annotated documents and portions thereof, obtained through email attachments, downloads and other content distribution means, including fast mobile mail messages and portions thereof, may be saved in the cloud service for subsequent access by other users or by the original authors. Existing authoring applications may not store information allowing correct routing of such modified documents. In order to support a natural routing process between all senders and recipients of the multimedia content related to fast mobile mail, the device software or the cloud service may add sender's routing identifier (routing ID), such as email address, to the Unified Resource Identifier (URI) of the saved location, i.e. to its access link. Furthermore, every transmission of the access link to recipients may include the routing ID of the sender and may be further augmented with routing IDs of all users who have subsequently edited the content and saved it to the cloud service. The URI may also be augmented with routing IDs of all recipients or only the recipients that have viewed the content. In this way, content exchange associated with fast mobile mail but not necessarily transmitted via email may automatically build several user groups associated with the content. These groups may include, for example, authors (users who have actually modified the content), recipients (everyone who has received the links to content), and viewers (users who have downloaded the content from received links to content locations). In particular, it becomes possible to send all of the authoring content that has been created in an authoring application.

BRIEF DESCRIPTION OF THE DRAWINGS

Embodiments of the system described herein will now be explained in more detail in accordance with the figures of the drawings, which are briefly described as follows.

FIGS. 2A-2C illustrate navigation (scrolling) and search results within a fast mobile mail message according to embodiments of the system described herein.

FIGS. 3A-3B illustrate two system architecture charts and interactions between device software, cloud service and conventional mail system according to embodiments of the system described herein.

FIG. 7 is a content access and routing chart for documents and portions thereof saved to the cloud service from authoring applications such as fast mobile mail and accessible via content links according to an embodiment of the system described herein.

DETAILED DESCRIPTION OF VARIOUS EMBODIMENTS

The system described herein provides a mechanism for communications between mobile users whereby replying to an email on a mobile device includes a responder applying fast reply tokens, which represent snippets of multimedia content overlaid upon the original text and in line with the previously added fast reply tokens. The system augments and in many instances replaces a traditional mail where responding to a message involves heavy typing, conflicting with the contemporary mobile usage metaphor, especially on keyboardless smartphones and tablets.

Figure 1C:
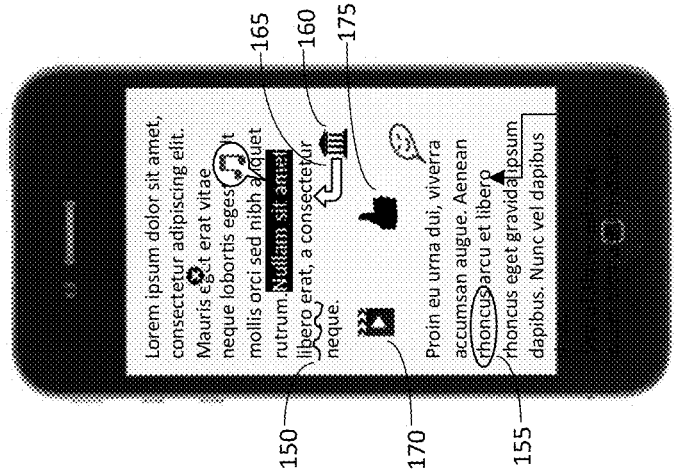
FIGS. 1A-1C are schematic illustrations of fast reply tokens in fast mobile mail messages according to an embodiment of the system described herein.
Figure 1B:
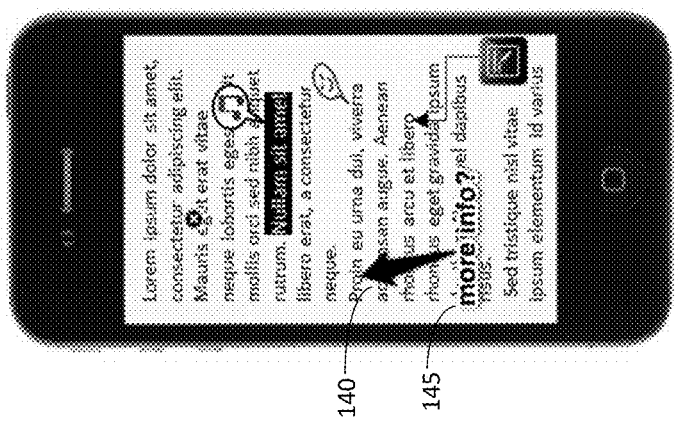
Figure 1A:
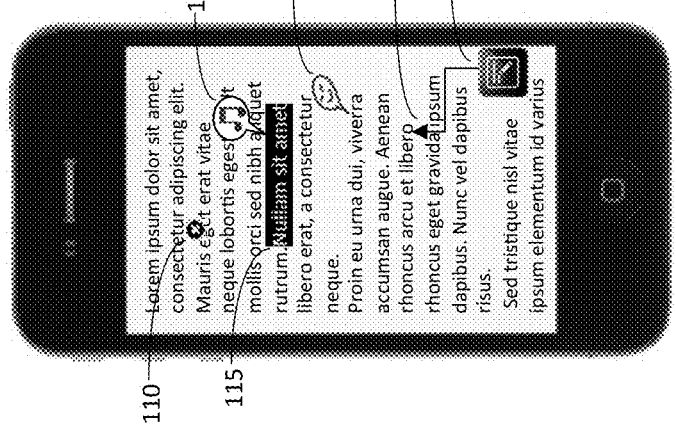

FIGS. 1A-1C are schematic illustrations 100 of various types of fast reply tokens applied by a responder within fast mobile mail messages according to an embodiment of the system described herein. A deletion token 110 is a recommendation by the responder to delete a word. In various embodiments, it may be either a markup sign or an active button attached to the underlying content that deletes the word upon being pressed by a recipient of the fast mobile mail message. A highlighted text token 115 is annotated by an audio clip token 120 represented as a callout with symbolic icon; the clip may be replayed upon clicking on the note icon portion of the token 120. A callout-shaped smiling face emoticon token is illustrated as being attached to the word "viverra" in the original text of the message. A brief text note token 130 is collapsed on FIGS. 1A-1B and is a comment to the word "libero" in the original message, as shown by a connector 135. All the fast reply tokens 110, 115, 120, 125, 130, 135 are also shown on FIG. 1B, which adds other annotation elements—a pointing arrow token 140 and an overlaid text comment token 145 applicable to a word pointed to by the arrow. It should be noted that all fast reply tokens 110, 115, 120, 125, 130, 135, 140, 145 are positional inline elements that are tied to specific elements of the original message, such as words and highlighted text fragments, and add comments to the specific elements or express a responder's mood with respect to the specific elements. FIG. 3C shows three more types of positional inline markup elements—a fragment of freehand writing (underline, in this case) token 150, an encircling shape token 155 (which may be chosen from a broad shape palette), and a clipart icon token 160 that is attached to a word in the text by a connector/pointing arrow token 165. In an embodiment of the system described herein, the fast reply tokens 110, 115, 120, 125, 130, 135, 140, 145, 150, 155, 160, 165 may all be displayed on top of the original message content and do not necessarily require reformatting and adding blank space to the original message.

Another option is illustrated by two unattached fast reply tokens—a video clip icon token 170 and a thumbs up (approval) emoticon token 175. The content of the video clip icon token 170 and an emotion or mood associated with the emoticon token 175 may apply to the above or the following paragraph in the original message or both depending on the context and responder intent. In different embodiments, techniques to add free space and to insert new elements into the original message may vary. In one embodiment, fast reply tokens may be chosen from a special toolbox of unattached tokens, and dropping them at a certain position in the message may automatically create enough free space (for example, lines of text below the dropping position are moved down) to insert the token.

Figure 2A:
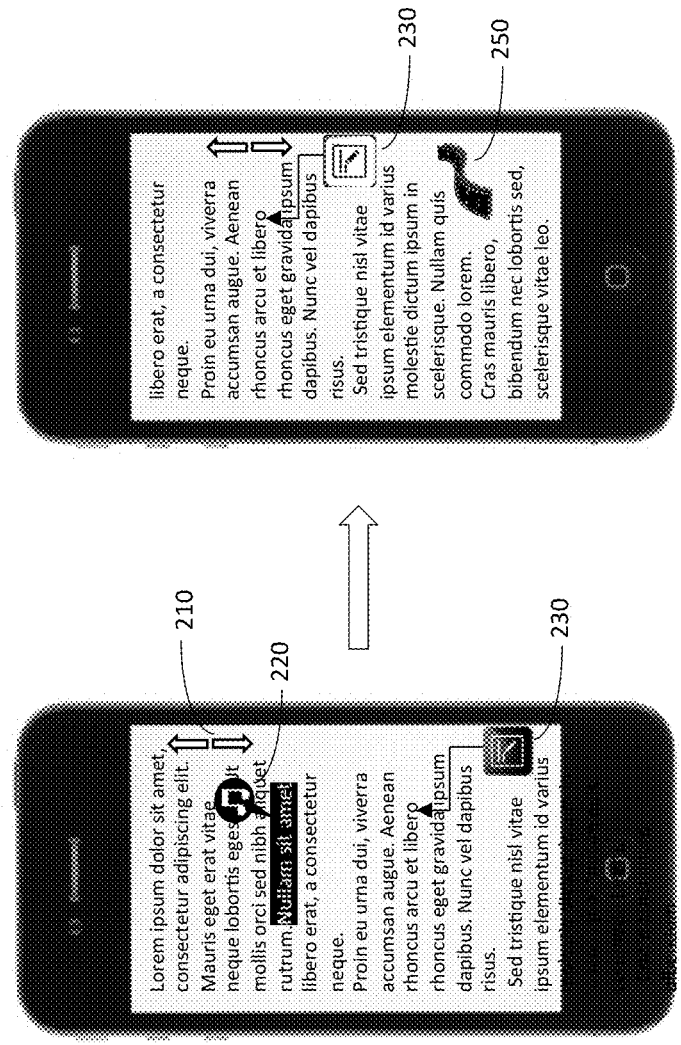

Because fast reply tokens are applied to different portions of the message and have different display formats, efficient navigation and search in fast mobile mail is useful. FIGS. 2A-2C are a schematic illustration of navigation (progressive scrolling) of a fast mobile mail message and of search capabilities of fast mobile mail software. A progressive scrolling button 210 on FIG. 2A is part of a user interface for fast mobile mail; tapping the button 210 moves the message down (or up) and selects a next fast reply token. As illustrated on FIG. 2A, a currently selected fast reply token 220 is a callout with an audio clip (selection is shown here, for the explanatory purpose, by inverting colors of the token). The fast reply token 220 is placed by the device software, for better visibility, in a top portion of the mobile device screen, near the middle thereof. A next fast reply token 230 on the left screen of FIG. 2A is a collapsed text note with a connector. Pressing the progressive scrolling button 210 in the down direction scrolls the message down, selects the fast reply token 230 (the fast reply token 230 is shown in inverted colors in the right screen) and positions the portion of the message corresponding to the fast reply token 230 for convenient viewing on the screen, as shown in the right part of FIG. 2A. Subsequently, pressing the down portion of the progressive scrolling button 210 would select and re-position a film strip fast reply token 250, while pressing the up portion of the progressive scrolling button 210 would reverse the navigation and return the screen to an initial position showing the selected fast reply token 220. Generally, the scrolling button allows scrolling between instances of fast reply tokes in a message.

Searching in fast mobile mail messages is illustrated on FIGS. 2B-2C. A search field 260 directs searching by categories, keywords and/or other attributes and content elements of fast reply tokens. For example, the search field 260 of FIG. 2B searches by fast reply token categories "emoticons" or "clipart" and is applied to the message illustrated on FIGS. 1A-1C, to result in three tokens 270 on the visible screen: an inline smiling face emoticon token, an unattached thumbs up emoticon token, and a clipart token. Of course, it is possible that the rest of the fast mobile mail message contains other fast reply token satisfying the search term and accessible via progressive scrolling button 275. FIG. 2C illustrates search results in fast mobile mail message by another search term 280, combining categories audio and video of fast reply tokens to retrieve two fast reply tokens 290 with an audio and video clip. Other search results (if any) may be reached using buttons 295.

FIGS. 3A-3B are system architecture charts, showing interactions between device software, cloud service and a conventional mail system according to embodiments of the system described herein. FIG. 3A illustrates an embodiment of the system where traditional mail software is functioning separately from the fast mobile mail service and is interacting with the cloud service, which is part of fast mobile mail. A fast mobile mail message 305 is created by device software 310 by adding fast reply tokens to an original regular mail message 340 delivered to the regular mail client running on the mobile device by a mail server 330 (which may also be an XMPP instant messaging server or other message delivery solution). The device software 310 utilizes user settings stored in a cloud service 320 and saves completed fast mobile mail messages, along with a recipient list designated by the sender, to the network storage part of the cloud service. Subsequently, the cloud service 320 analyzes received fast mobile mail messages and their recipient lists, prepares necessary delivery options, adaptations, links to stored content and other necessary data, forms regular emails with links to stored content (where necessary), and delivers, to the mail server 330, regular email messages addressed to appropriate recipients. The mail server 330 then routes the email messages to recipients, possibly using the same channel. In the architecture of FIG. 3A, an authoring part of fast mobile mail 310 is separated from the mail delivery channel and the mail server 330. At the same time, the device software 310 is capable of downloading fast mobile mail content directly from the network storage of the cloud service 320; such downloading may occur every time a recipient (or a sender) of a fast mobile mail message needs to access all details of fast reply tokens, which may not be available using regular email software. As explained elsewhere herein, fast mobile mail messages delivered via regular email may be rendered, to a certain extent, by regular mail client software; however, full rendering, progressive scrolling and search capabilities, editing and adding new fast reply tokens may be available only in the device software, which downloads full message content from the cloud service or extracts full message content from attached or embedded additional data in the regular email message.

FIG. 3B illustrates another embodiment of the system architecture where mail server and mail client software are tightly integrated with the cloud service and device software. In the embodiment of FIG. 3B, a mail server 380 functions as part of a cloud service 370 and delivers emails or documents 390 directly to device software 360, which combines functions of mail client software and fast mobile mail authoring software. In this architecture, all fast mobile mail messages 350 may be rendered and authored using a single software module running on the device (i.e., the device software 360).

Figure 4A:
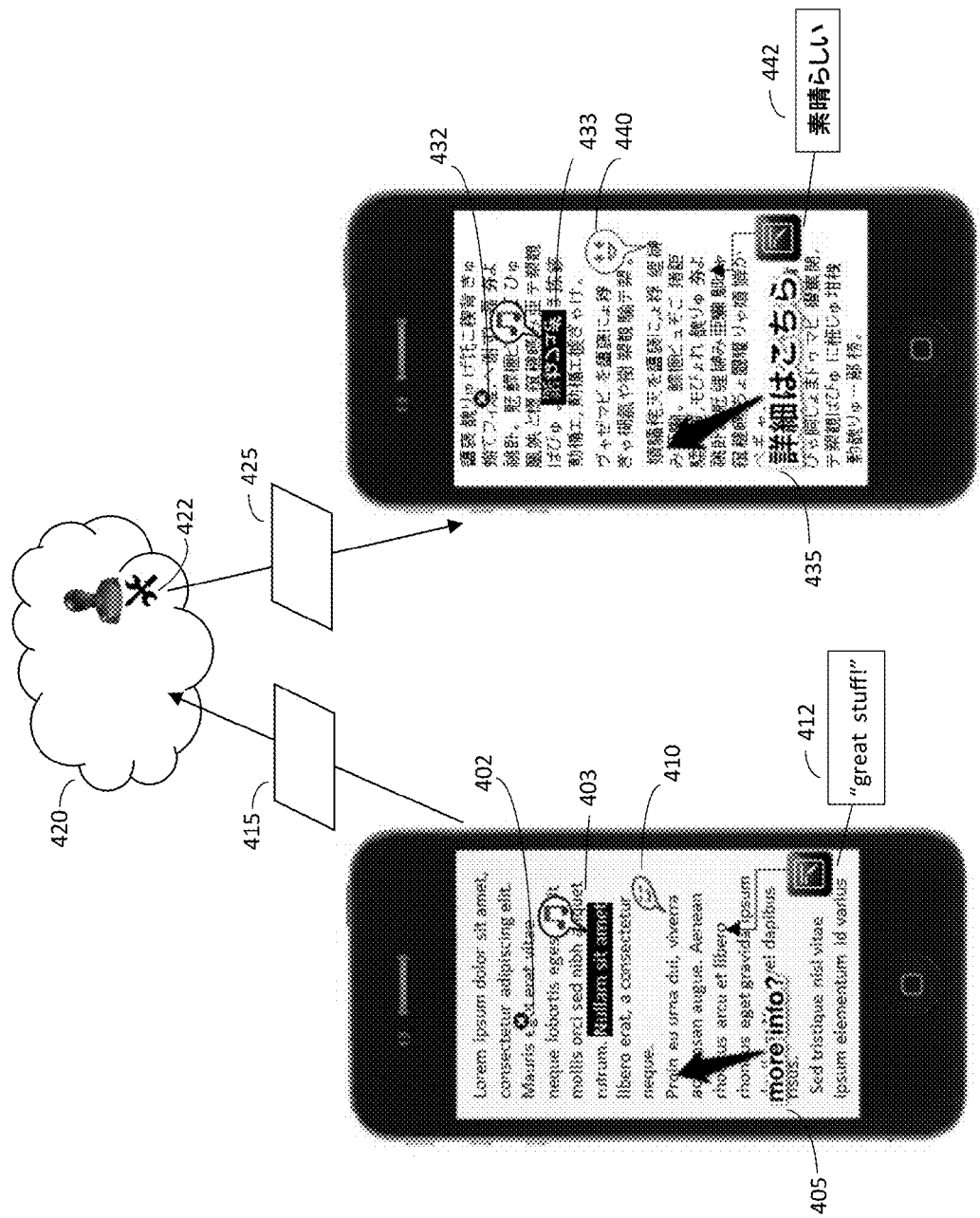
FIGS. 4A-4B are schematic illustrations of various adaptations of fast mobile mail messages to recipient devices and user defined options according to an embodiment of the system described herein.
Figure 4B:
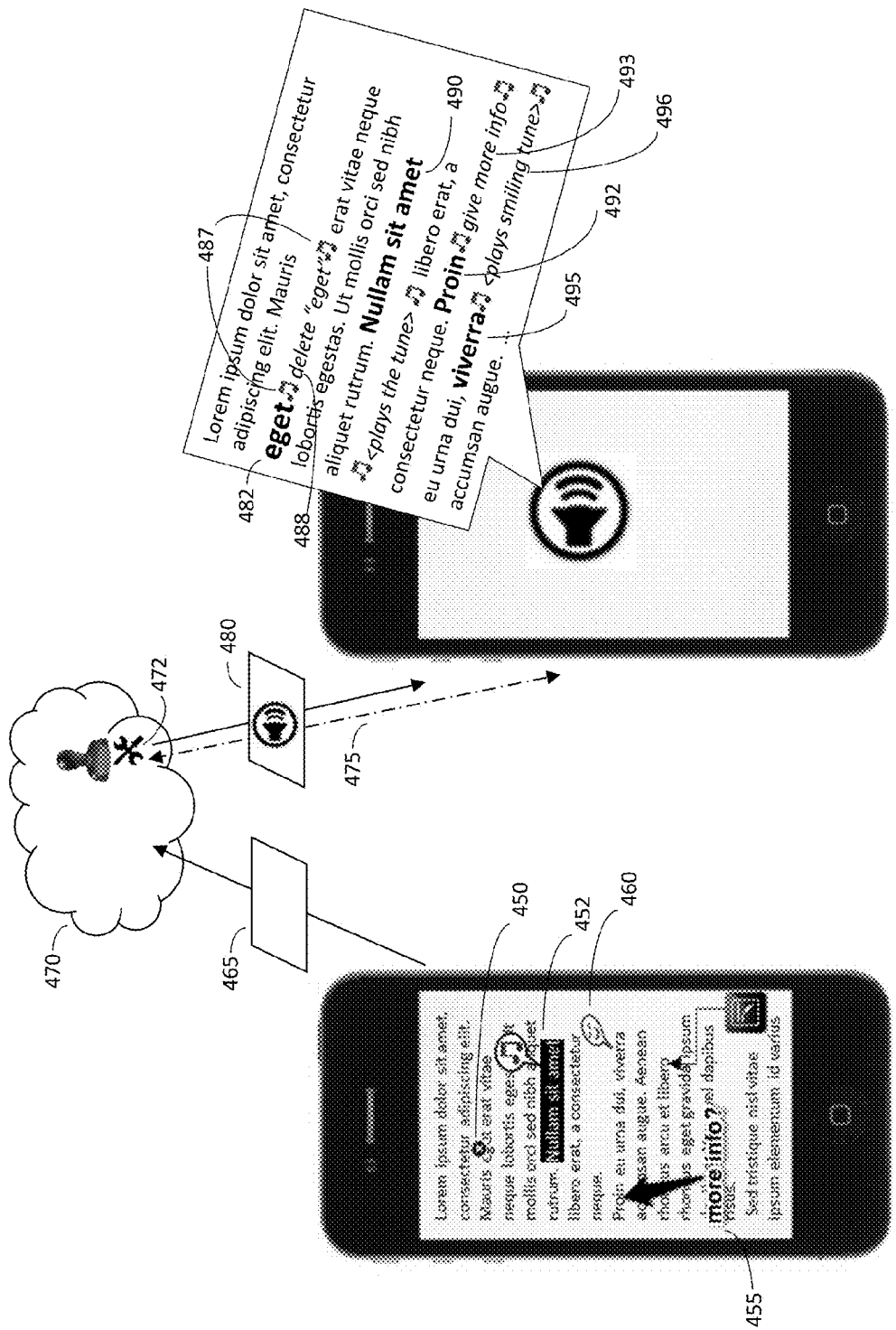

FIGS. 4A-4B illustrate two different adaptation scenarios for fast mobile mail messages, as explained elsewhere herein. FIG. 4A illustrates cultural adaptation and localization of a fast mobile mail message, while FIG. 4B shows adaptation of a message to special receiving conditions. After the fast mobile mail message has been created with a plurality of original fast reply tokens 402, 405, 410, 412, the fast mobile mail message is transmitted as a data package 415 that is supplied with a list of recipients to a cloud service 420 (in this example, the cloud service 420 combines fast mobile mail service and mail delivery functions, as explained elsewhere herein). Subsequently, the cloud service 420 analyzes the content and the list of recipients, along with fast mobile mail settings 422 for each recipient. In this example, the recipient settings 422 require adaptation of the fast mobile mail message to Japanese language and to a corresponding culturally acceptable appearance. The cloud service 420 performs such adaptation and delivers the adapted fast mobile mail message 425 to the recipient.

In of FIG. 4A, the following conversions have been made in the adaptation process:

(1A) the original text of the email message has been translated to Japanese;

(2A) a deletion fast reply token 402 and a sound clip fast reply token 403 have been reproduced in their original form as fast reply tokens 432, 433, except the markup to which the sound clip fast reply token 433 has been attached has migrated to the appropriate portion of the Japanese text;

(3A) a comment fast reply token 405 has been translated to a Japanese equivalent fast reply token 435 and reproduced with a similar pointing arrow in the adapted fast mobile mail message;

(4A) a text of note fast reply token 412 (which is shown in the collapsed form on the screen and the text is reproduced on an explication) has been translated to Japanese and an equivalent destination fast reply token 442 has been created;

(5A) an emoticon fast reply token 410 has been converted into a traditional Japanese emoji fast reply token 440 with a similar emotional meaning; the emoji was attached to the corresponding word in the translated text.

FIG. 4B illustrates an adaptation where an original, predominantly visual fast mobile mail message with certain audio elements is converted into an audio-only fast mobile mail message for a recipient whose settings require such adaptation at the time of message delivery (for example, the recipient is driving a car when receiving the message). The illustration shows adaptation of only part of the fast reply tokens; the rest of the adaptation is analogous. After the fast mobile mail message with fast reply tokens has been created, the fast mobile mail message is transmitted as a data package 465 to a cloud service 470, which analyzes the message content and recipients, as explained elsewhere herein. In this example, one of the recipients may have enabled a frequent driver option in settings 472, which provides for checking user status before delivering fast mobile mail messages. Accordingly, prior to delivering the message, the cloud service 470, which is connected to the mobile device as illustrated by a dashed arrow 475, discovers that the recipient status indicates that the recipient is driving and that immediate delivery is required, which implies adaptation of the fast mobile mail message to an audio format. The cloud service performs such adaptation and delivers an audio message 480 to a mobile device of the recipient. The audio message is subsequently replayed to the recipient. Specific adaptations of the original fast reply tokens are as follows:

(1B) text-to-speech conversion of the original message text (before fast reply tokens have been added) has been performed and the speech portion has been read to the recipient with modifications (described below);

(2B) each words or fragment of text to which a fast reply tokens is attached may be emphasized by audio volume, intonation, tempo or other audio means, as illustrated by bold text 482, 490, 492 and 495;

(3B) after each anchor word, a brief separator tune 487 may be replayed, in order to separate the body text (original message) from audio messages associated with fast reply tokens;

(4B) each fast reply token may be converted to a specific voice message and reproduced after a separator tune, concluded with another separator tune, identical to or different from the starting separator tune. For example, the deletion icon fast reply token 450 may be converted into a voice message 488 that says: "delete 'eget'", an audio tune 452 may be reproduced after an anchor fragment 490 without changes and may be separated from the speech by the separator tunes 487, a comment 455 may be read as a voice message 493, separated from an anchor word 492 and from the rest of the audio content of the fast mobile mail message by separator tunes, an emoticon 460 may be replaced with an audio equivalent, a smiling tune 496, which sounds after an anchor word 495 and the starting separator tune.

Figure 5:
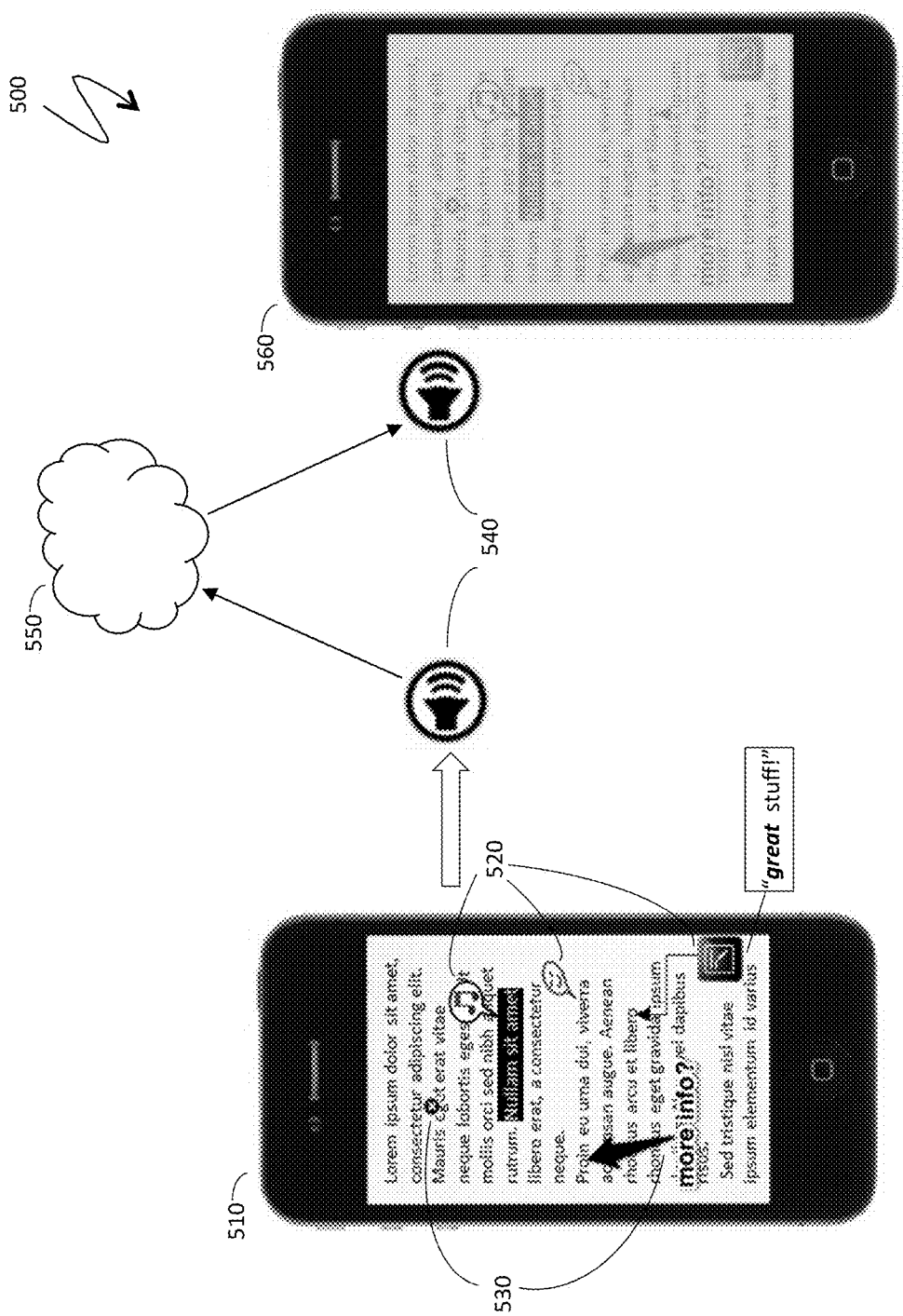
FIG. 5 illustrates creation and replay of an abstract summarizing a fast mobile mail message according to an embodiment of the system described herein.

FIG. 5 is an illustration 500 of creation and transmission of an abstract for a fast mobile mail message. Device software 510 running on a mobile device of a sender may analyze fast reply tokens and determine whether an abstract for the fast mobile mail message can be built. In this example, the device software 510 may analyze a first set of fast reply tokens 520 that tend to convey emotions and a second set of fast reply tokens 530 that tend to be emotionally neutral and decide that the overall tone of the message is, for example, positive and smiling (or similar). After the determination, the device software 510 may selects an abstract in the form of a happy tune (or similar) 540 or in other visual or audible content, attach the abstract to the fast mobile mail message, and transmit the fast mobile mail message with the abstract via a cloud service 550 to device software 560 running on a mobile device of a recipient. The recipient may decide whether to replay the abstract prior to displaying the fast mobile mail message, which may cause the screen 560 the received fast mobile mail message to be dimmed. The recipient may elect to read immediately, and then possibly defer or delete the received message based on the abstract.

Figure 6:
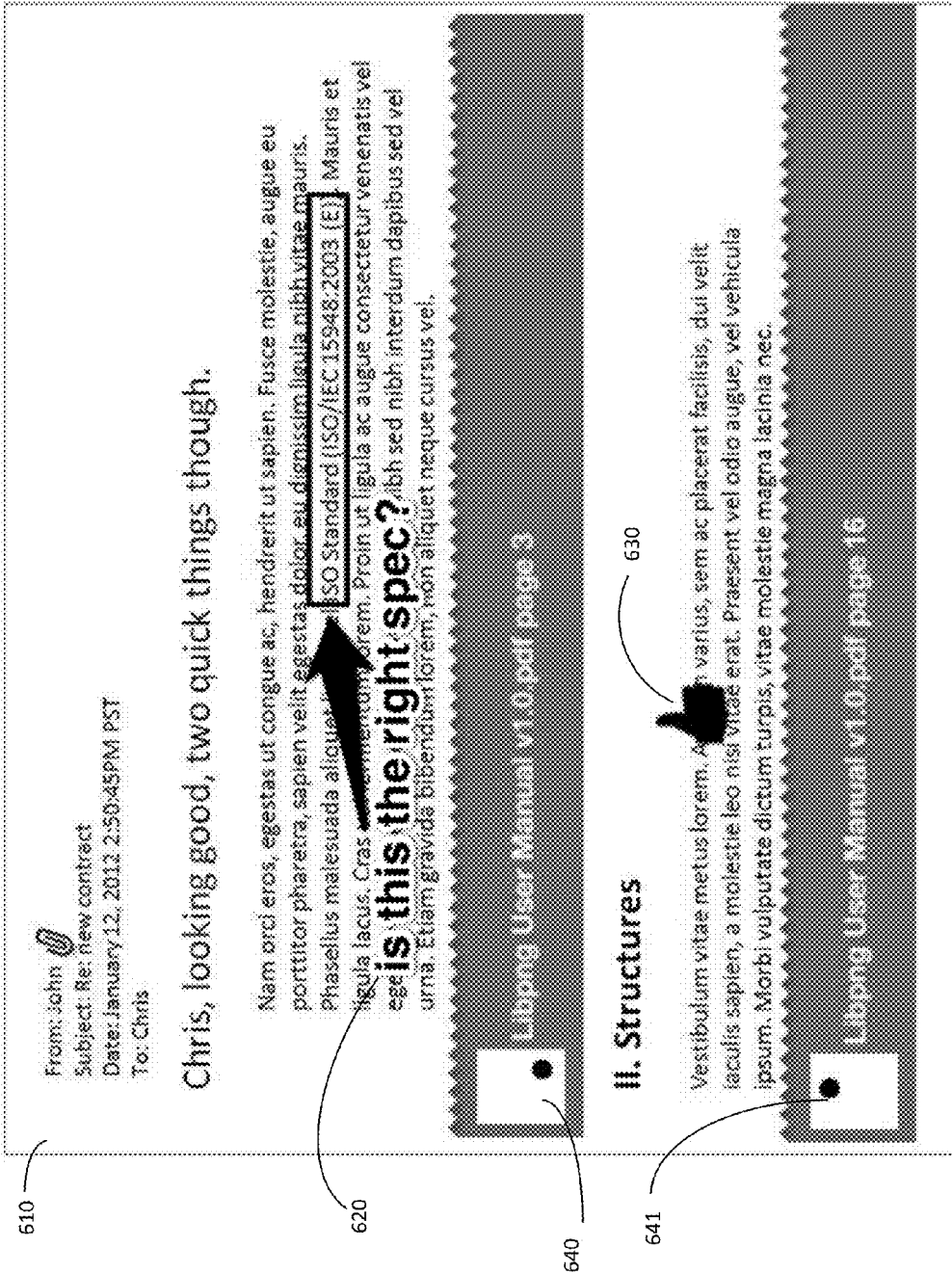
FIG. 6 is a schematic illustration of context indicators for referencing document snippets according to an embodiment of the system described herein.

FIG. 6 is an illustration 600 of context indicators for document snippets delivered within a fast mobile mail message. A fast mobile mail message 610 contains two snippets, extracted from one common PDF document. A first snippet is annotated with a fast reply token 620 containing a question, whereas another snippet includes a meeting an approval sign, an emoticon fast reply token 630. In order to adequately locate the snippets in the source document, context indicators 640 may be appended to each snippet showing not only the source document and the page from which the snippet was clipped but also the location of the snippet on the page, illustrated by locators on corresponding graphical matrixes 640, 641. Thus, the snippet in the first example was extracted from the bottom right corner of page 3 of the document, as indicated by the matrix 640, whereas in the second example, the snippet was clipped from the middle top portion of page 16 of the same document, as indicated by the matrix 641.

FIG. 7 is a content access and routing chart 700 for documents and other content created and edited by authoring applications and stored in the cloud. The documents and other content may be available via download links to multiple recipients, authors and viewers and may be simultaneously distributed via email and other conventional content delivery services. A proposed method of content publishing and access takes advantage of enhanced routing technique, as explained elsewhere herein. An authoring application (AuthApp) 710 creates original content 715 and publishes the original content on a cloud-based content management service 720. The AuthApp 710 may also create a custom Universal Resource Identifier (URI) 725 for accessing the published content. The custom URI 725 consists of an identifier or name of the authoring application 710, location of the published content (such as a web URL), and a routing ID of the publisher, or sender, of the content, which can be an email or other routing address of the sender that locates the sender on the Internet.

The custom URI 725 may be distributed via traditional content delivery services, such as email. In this example, content created by the authoring application 710 may be fully rendered by regular mail software. After the URI 725 is delivered to another authoring application (AuthApp) 730, the other authoring application 730 retrieves and edits the original content and creates modified content 735, such as a fast mobile mail message. In some cases, regular mail software may not be capable of full rendering of the modified content 735. After the other authoring application 730 saves the modified content to the cloud and creates a second custom URI, which may include routing IDs of both the original sender and the recipient (who has become the second author), the AuthApp 730 analyzes the modified content, discovers that the modified content cannot be rendered by a regular email and, as a result, creates a separate content instance for rendering in an email, which may be as close as possible to fully displayed content in the authoring application itself.

The separate content instance may be in the form of HTML mail, embedded pre-rendered image, etc. The AuthApp 730 may then add the separate content instance of the modified content to the body of an email message, along with the second custom URI for the modified content. The AuthApp 730 may then transmit the message to mail client software 740, which renders the (simplified) separate content instance to provide rendered content 745 and transmits the rendered content 745, via a mail server 750 and other parts of a mailing system, to subsequent recipients (the original sender and/or other recipients). The recipients may view the rendered content using mail software. The recipients may also receive custom URIs, which, if the recipients also have authoring software installed and capable of processing full content, the recipients may use to download, fully render and further modify the content. In an embodiment, authoring applications that further modify and distribute content may add not only a routing ID corresponding to the authoring application, but also routing IDs of subsequent recipients. This technique builds up groups of authors, recipients and viewers simultaneously with content distribution, as explained elsewhere herein. Note that, in some cases, it may be possible to send the changes without sending the content. Note also that it is possible to make a document accessible over the Internet using a mechanism other than cloud storage.

Figure 8A:
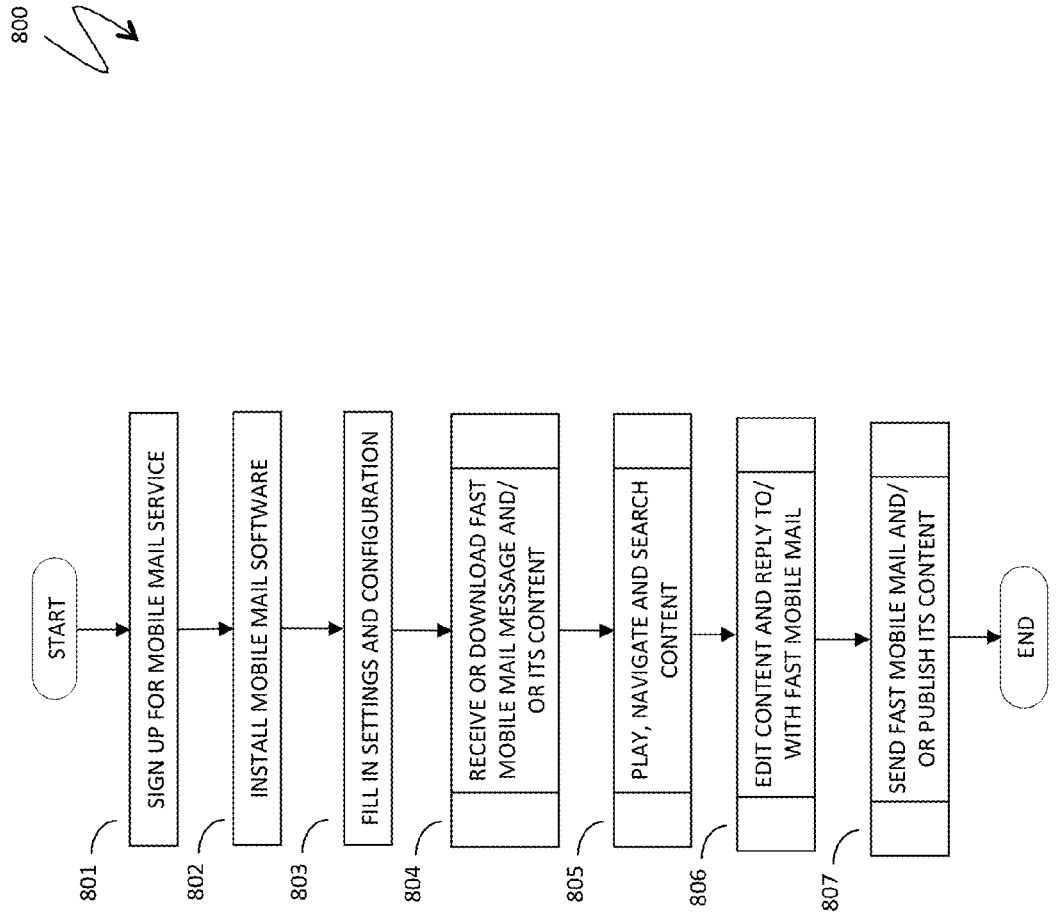
FIGS. 8A-8D are system flow diagrams that describe processing associated with different embodiments of the system described herein.

Referring to FIG. 8A, a flow diagram 800 illustrates processing performed in connection with user activities with fast mobile mail. Processing starts at a step 801 where a user signs up for the fast mobile mail service. After the step 801, processing proceeds to a step 802, where the user installs the fast mobile mail software, that is, the device software, as explained elsewhere herein. After the step 802, processing proceeds to a step 803, where the user fills in settings and configuration for fast mobile mail software and service, as explained elsewhere herein. Settings may be stored under an account of the user in a cloud service and may be fully or partially duplicated on mobile device(s) where the user runs fast mobile mail.

After the step 803, processing proceeds to a step 804, where the user receives a fast mobile mail message or downloads corresponding content from network storage using links provided via email or other means, such as custom URIs, as explained elsewhere herein (see in particular FIG. 7, described above). It should be noted that the user may also receive an ordinary mail message from mail accounts that do not have fast mobile mail installed or do not use fast mobile mail to enhance communication. Depending on a particular embodiment of the system architecture, software that receives the message on the mobile device of the user may be regular mail client software that communicates with the device software or the device software that combines the fast mobile mail authoring function with the mail client capabilities (see in particular FIGS. 3A-3B, described above). After the step 804, processing proceeds to a step 805, where the user views, navigates and searches the content of the received fast mobile mail message, as explained elsewhere herein (see, for example, FIGS. 2A-2C, 5, and 6, described above). After the step 805, processing proceeds to an optional step 806, where the user edits the received mail message and replies to/with a first (in case the original message was an ordinary mail message) or another fast mobile mail message (see, for example, FIGS. 1A-1C, described above). In cases where the user responded to the received message, after the step 806, processing proceeds to a step 807, where the user sends the created fast mobile mail message and/or publishes a copy of the message or copies of portions of content of the message to the cloud service, as explained elsewhere herein (see, for example, FIGS. 3A-3B, 4A-4B, 5, and 7, described above). It should be noted that the system may automatically publish any needed copies to the cloud service based on user settings or on analysis of the message content. Following the step 807, processing is complete.

Figure 8B:
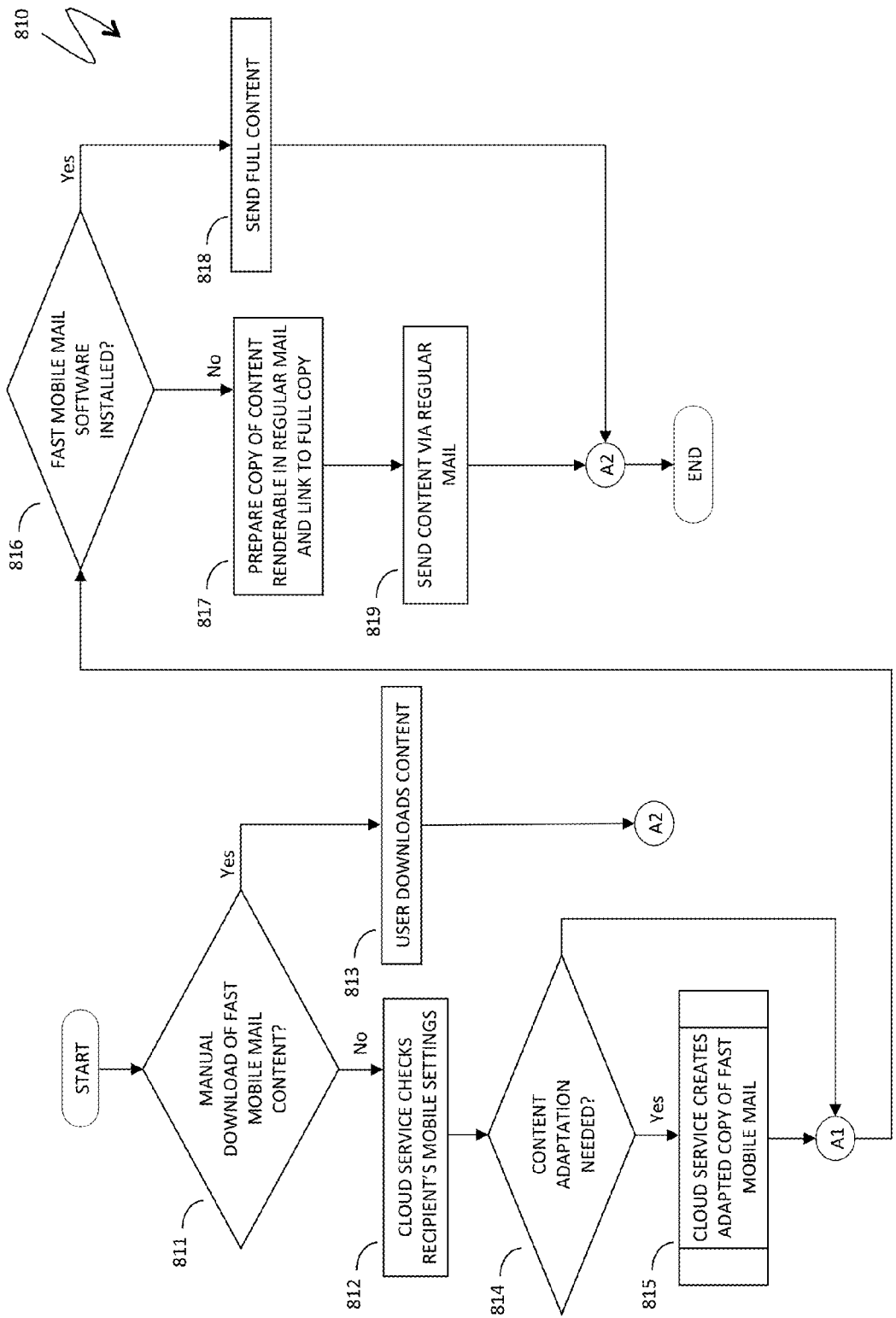

Referring to FIG. 8B, a flow diagram 810 illustrates in more detail processing provided at the step 804 where the user receives or downloads fast mobile mail message and/or its content. The user receiving fast mobile mail messages may be fulfilled via different services, software and user activities and may also depend on the system architecture, as explained elsewhere herein. Processing starts at a test step 811 where it is determined whether the user intends to manually download the content of a fast mobile mail message using, for example, a received custom URI like the custom URI 725 described elsewhere herein. If so, then control transfers from the step 811 to a step 813 where the user downloads the needed content. Following the step 813, processing is complete.

If it is determined at the step 811 that the user does not intend to manually download the content of a fast mobile mail message, then control transfers from the step 811 to a step 812 where the cloud service checks recipient's mobile settings to determine delivery format and options for the fast mobile mail message and/or the downloadable content. All subsequent steps on the flow diagram 810 pertain to the cloud service. After the step 812, control transfers to a test step 814, where it is determined whether content adaptation is needed for the recipient. If so, then control transfers to a step 815 where the cloud service creates an adapted copy of the fast mobile mail message. As discussed elsewhere herein, message adaptation may include one or more of the following: language translation of textual and/or audio information; cultural adaptation, such as replacing emoticons and clipart with their culturally acceptable instances based on user preferences; converting fast reply tokens or the whole fast mobile mail message into different formats, such as audio-only or visual-only formats, etc. (see, for example, FIGS. 4A-4B, described above).

If it is determined at the test step 814 that there is no need for adaptation, then control transfers to a test step 816. Note that the test step 816 is also reached from the step 815, described above. At the test step 816, the cloud service determines, based on the recipient user settings, whether the device software is installed on the target mobile device for message delivery. If so, then control transfers to a step 818 where the cloud service sends the full content of the fast mobile mail message to the recipient's device since the message can be rendered in its entirety by the installed device software. Following the step 818, processing is complete.

If it is determined at the test step 816 that the recipient does not have appropriate device software installed, then the control transfers from the step 816 to a step 817. At the step 817, the cloud service prepares a renderable instance of the fast mobile mail message for delivery by a regular electronic mail. Producing a renderable instance may include providing an HTML version or pre-rendered image(s) of the fast mobile mail message (potentially adapted at the step 815). At the step 817, the cloud service may publish full content of the fast mobile mail message to its cloud storage, creates a link to that content, such a custom URI, and augments the message with a link to the custom URI, which enables the recipient to receive the full fast mobile mail message on a different mobile device or on the same device after installing the device software at a later time. After the step 817, control transfers to a step 819, where the cloud service sends, via regular email, a simplified version of the fast mobile message and the custom URI link to the published copy of the full content. Following the step 819, processing is complete.

Figure 8C:
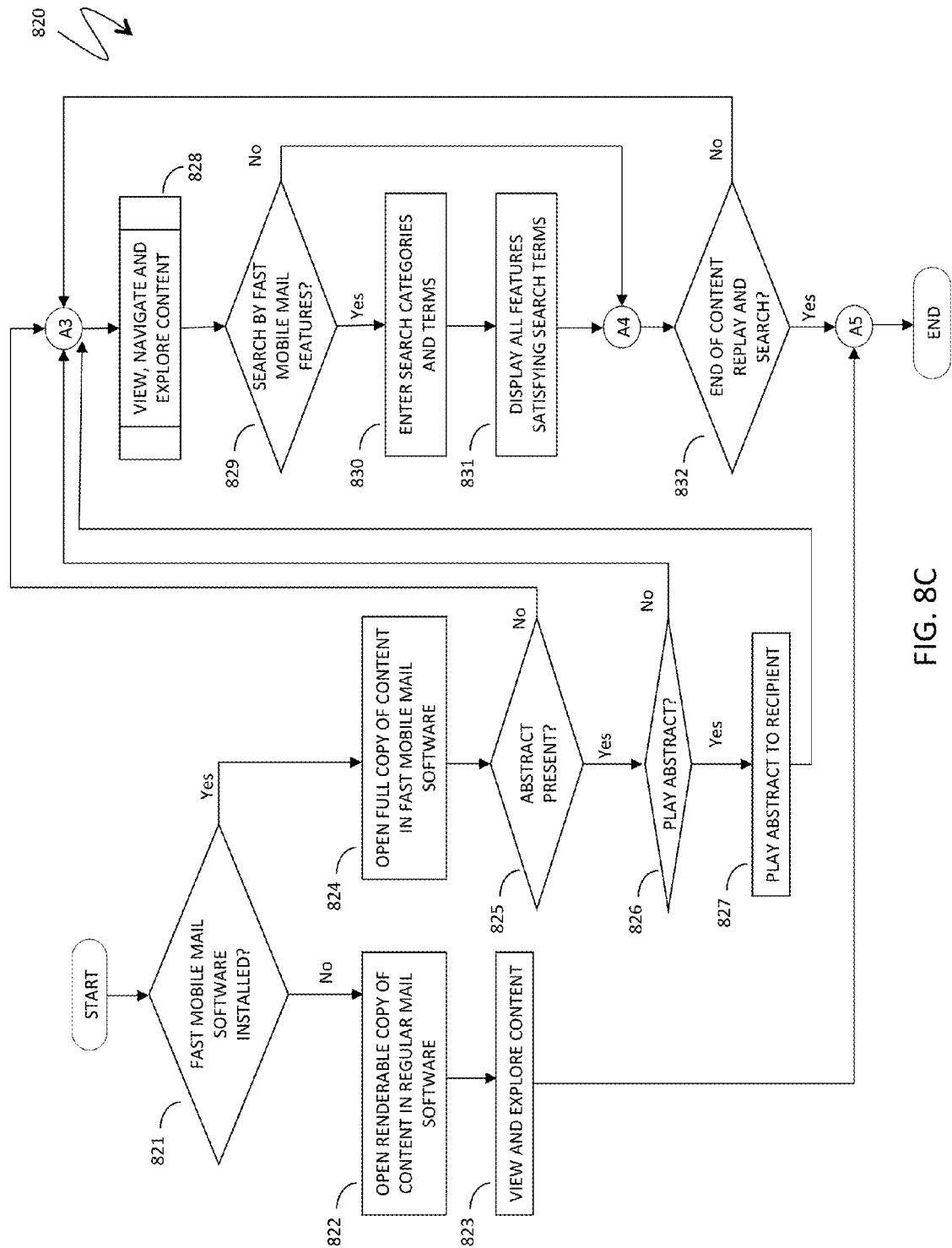

Referring to FIG. 8C, a flow diagram 820 illustrates in more detail processing provided at the step 805 where the user replays, navigates and searches the content of the received fast mobile mail message. Processing starts at a test step 821 where it is determined whether device software is installed on the user's mobile device to enable playing fast mobile mail messages. If so, then control transfers from the test step 821 to a step 824. Otherwise, control transfers to a step 822. At the step 822, the renderable copy of the content fast mobile mail message (discussed elsewhere hereon) is opened in the regular mail software on the mobile device. After the step 822, processing proceeds to a step 823, where the user goes through an ordinary activity of viewing and exploring the content of the regular mail message (a simplified version of the full fast mobile mail message). After the step 823, processing is complete.

At the step 824, the user opens a full copy of the fast mobile mail message in the device software installed on the mobile device. After the step 824, processing proceeds to a test step 825, where it is determined whether an introductory abstract to the message is present, as explained elsewhere herein (see, for example, FIG. 5, described above). If the abstract is absent then processing proceeds to a step 828. Otherwise, processing proceeds to a test step 826 where it is determined whether the user wants to play the abstract for the fast mobile mail message. If so, then processing proceeds to a step 827 where the abstract is replayed to the user. Otherwise, processing proceeds to the step 828. Note that the step 828 also follows the step 827. At the step 828, the user views, navigates and explores content using regular and special means, such as progressive scrolling buttons 210 on FIG. 2A. After the step 828, processing proceeds to a test step 829 where it is determined whether the user wants to search by fast mobile mail features. If not then processing proceeds to a test step 832. Otherwise, processing proceeds to a step 830, where the user enters search terms, including possibly categories of fast reply tokens, as explained in more detail in connection with FIGS. 2B-2C and in the accompanying text. After the step 830, processing proceeds to a step 831 where the device software displays all features satisfying the search terms, such as fast reply tokens and other fragments of the fast mobile mail message. After the step 830, processing proceeds to the test step 832 where it is determined whether the user has finished content replay, navigation and search. If so, then processing is complete. Otherwise, processing proceeds back to the step 828 for further viewing, navigation and exploring of the content.

Figure 8D:
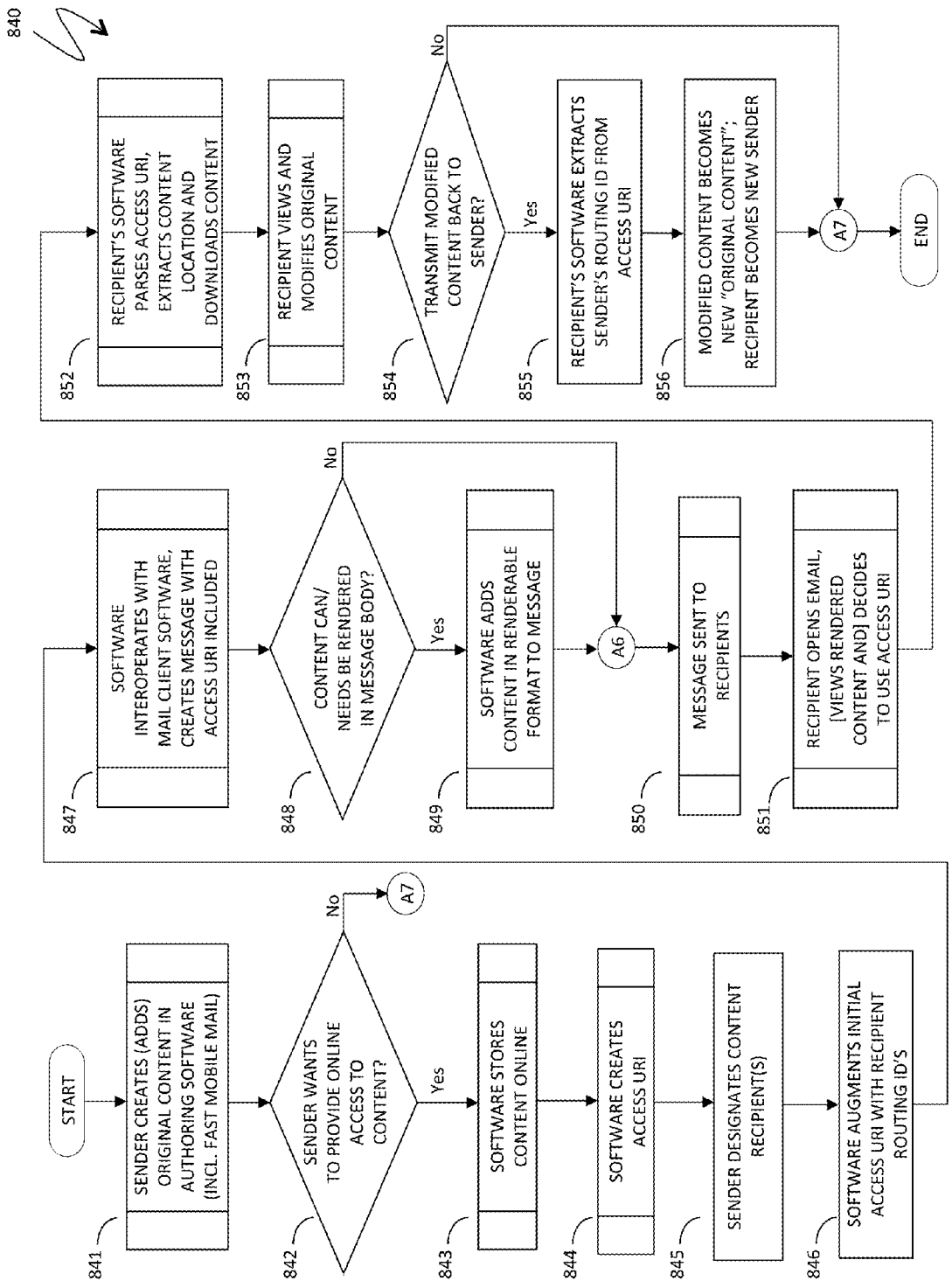

Referring to FIG. 8D, a flow diagram 840 illustrates in more detail publishing and delivering complex content created using authoring software with networking capabilities when the content may not be fully viewable and/or editable in regular mail software, such as fast mobile mail published at the step 807 of FIG. 8A. Processing starts at a step 841 where a sender creates a new original content or modifies an existing piece of content using authoring software, such as fast mobile mail or possibly other authoring software. After the step 841, processing proceeds to a test step 842, where it is determined whether the sender (author, user) wants to provide online access to the content or just wants to save the content locally on the device where the content was created. If the sender does not want to provide online access then processing is complete. Otherwise, processing proceeds to a step 843 where authoring software stores the content online. In case of fast mobile mail, such storage may be provided within a cloud service, as explained elsewhere herein. After the step 843, processing proceeds to a step 844, where the authoring software creates a custom URI (link) for the content published at the step 843. As explained elsewhere herein and illustrated in FIG. 7 and the accompanying text, the custom URI may include a sender's routing ID to allow identifying the sender as the author of the published copy of the content and to communicate with the sender concerning the content.

After the step 844, processing proceeds to a step 845, where the sender designates recipients of the published content. After the step 845, processing proceeds to an optional step 846, corresponding to an embodiment of the system where the authoring software augments the initial custom URI provided at the step 844 with routing IDs of the recipients. After the step 846, processing proceeds to a step 847, where the authoring software interoperates with mail client or other communications software to create a deliverable email message, an instant message or other medium with custom URI included. Such a message may or may not need the content to be rendered in the body of the message; thus, mail systems may render content in mail client software when possible but many instant messaging systems may not, for the sake of brevity of each step of communications. Accordingly, following the step 847, processing proceeds to a test step 848, where it is determined whether the content has to be rendered, at least partially, in the body of the message prepared for delivery to the recipients at the step 847. If so, then processing proceeds to the step 849. Otherwise, processing proceeds to the step 850. At the step 849, authoring software creates a rendering approximation of the full (published) content, suitable for rendering capabilities of the regular mail, as explained in more details in conjunction with the FIG. 7. The software then adds the data representing such approximation to the message. After the step 849, processing proceeds to the step 850, where the message is sent to recipients.

Following the step 850, the remaining steps of the flow diagram 840 pertain to a recipient of the message distributed by the authoring software, such as the fast mobile mail. After the step 850, processing proceeds to a step 851, where a recipient opens the received email or other communication (such as an instant message, a tweet or a newly posted Facebook entry), optionally views the rendered content of the message available in the body of the message (if such content has been added at the step 849) and decides whether to use the custom URI present in the message. After the step 851, processing proceeds to a step 852, where a recipient's copy of the authoring software parses the custom URI, extracts content location and downloads full content. After the step 852, processing proceeds to a step 853, where the recipient views and optionally modifies the downloaded (original) content. After the step 853, processing proceeds to a test step 854, where it is determined whether the recipient is interested in transmitting the modified content back to sender. If not, then processing is complete. Otherwise, processing proceeds to a step 855 where the recipient's software extracts a sender's routing ID from the custom URI and adds the sender's routing ID to the list of recipients of the modified content. After the step 855 is a step 856 where the recipient and the original sender exchange roles and the current recipient/author becomes another sender. Following the step 856, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible. Note that the system described herein may work with a desktop, a laptop, and/or any other computing device in addition to a mobile device.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of facilitating replying to email messages received on a mobile device, comprising:
presenting on the mobile device a selectable set of fast reply tokens that correspond to snippets of multimedia content, wherein at least some of the fast reply tokens include at least one of: action icons, status icons, emoticons, emojis, expressive elements, clip art, highlighters, geometric shapes, arrows, short tunes, audio clips, video clips, and freehand notes;
providing a mechanism to superimpose a selected subset of the fast reply tokens on to different portions of the received email message to compose a fast mobile message, wherein the fast reply tokens are separate from any reply email text; and
sending the fast mobile message with a list of recipients to a cloud service.

2. A method, according to claim 1, further comprising:
providing cultural adaptations and localization of fast reply tokens based on a setting provided by a recipient of the annotated email message.

3. A method, according to claim 1, wherein the mechanism to superimpose the fast reply tokens includes dragging each of a selected one of the fast reply tokens on to a corresponding portion of the annotated email message.

4. A method, according to claim 1, further comprising:
superimposing a progressing scrolling bar for fast reply tokens on to the one of the received email messages to facilitate efficient navigation therethrough.

5. A method, according to claim 1, further comprising:
providing a search bar for searching the fast reply tokens by category.

6. A method, according to claim 1, further comprising:
automatically restricting a user to sending only particular types of input in response to the user being in a particular setting.

7. A method, according to claim 6, further comprising:
automatically restricting the user to receiving only particular types of input in response to the user being in a particular setting.

8. A method, according to claim 7, wherein the user is restricted to sending and receiving audio-only input in response to the user being in a moving automobile.

9. A method, according to claim 7, further comprising:
automatically converting a message from a first type of input to one of the particular types of input, wherein the first type of input is not one of the particular types of input.

10. A method, according to claim 1, further comprising:
determining an overall tone of the annotated email message based on the fast reply tokens superimposed on to the annotated email message; and
providing to a recipient an indication of the overall tone of the annotated email message.

11. A method, according to claim 10, wherein the overall tone of the annotated email message is positive and smiling.

12. A method, according to claim 1, further comprising:
including context information with at least some of the fast reply tokens superimposed on to the annotated email message, wherein the context information includes portions of source documents associated with at least some of the fast reply tokens.

13. A method, according to claim 12, wherein each of the portions of source documents includes location information indicating a location within the document for the corresponding portion.

14. A method, according to claim 13, wherein the location information indicates a page and a position on the page for the corresponding portion.

15. A method, according to claim 14, wherein the position on the page is descriptive.

16. A method, according to claim 14, wherein the position on the page is indicated using a graphical matrix.

17. A non-transitory computer readable medium containing software that facilitates replying to received email messages, the software comprising:
executable code that presents a selectable set of fast reply tokens that correspond to snippets of multimedia content, wherein at least some of the fast reply tokens include at least one of: action icons, status icons, emoticons, emojis, expressive elements, clip art, highlighters, geometric shapes, arrows, short tunes, audio clips, video clips, and freehand notes;
executable code that superimposes a selected subset of the fast reply tokens on to different portions of the received email message to compose an annotated email, wherein the fast reply tokens are separate from any reply email text; and
executable code that sends the annotated email message.

18. A non-transitory computer readable medium, according to claim 17, further comprising:
executable code that provides cultural adaptations and localization of fast reply tokens based on a setting provided by a recipient of the annotated email message.

19. A non-transitory computer readable medium, according to claim 17, wherein the mechanism to superimpose the fast reply tokens includes dragging each of a selected one of the fast reply tokens on to a corresponding portion of the annotated email message.

20. A non-transitory computer readable medium, according to claim 17, further comprising:
executable code that superimposes a progressing scrolling bar for fast reply tokens on to the one of the received email messages to facilitate efficient navigation therethrough.

21. A non-transitory computer readable medium, according to claim 17, further comprising:
executable code that provides a search bar for searching the fast reply tokens by category.

22. A non-transitory computer readable medium, according to claim 17, further comprising:
executable code that automatically restricts a user to sending only particular types of input in response to the user being in a particular setting.

23. A non-transitory computer readable medium, according to claim 22, further comprising:
executable code that automatically restricts the user to receiving only particular types of input in response to the user being in a particular setting.

24. A non-transitory computer readable medium, according to claim 23, wherein the user is restricted to sending and receiving audio-only input in response to the user being in a moving automobile.

25. A non-transitory computer readable medium, according to claim 23, further comprising:
executable code that automatically converts a message from a first type of input to one of the particular types of input, wherein the first type of input is not one of the particular types of input.

26. A non-transitory computer readable medium, according to claim 17, further comprising:
    executable code that determines an overall tone of the annotated email message based on the fast reply tokens superimposed on to the annotated email message; and
    executable code that provides to a recipient an indication of the overall tone of the annotated email message.

27. A non-transitory computer readable medium, according to claim 26, wherein the overall tone of the annotated email message is positive and smiling.

28. A non-transitory computer readable medium, according to claim 17, further comprising:
    executable code that includes context information with at least some of the fast reply tokens superimposed on to the annotated email message, wherein the context information includes portions of source documents associated with at least some of the fast reply tokens.

29. A non-transitory computer readable medium, according to claim 28, wherein each of the portions of source documents includes location information indicating a location within the document for the corresponding portion.

30. A non-transitory computer readable medium, according to claim 29, wherein the location information indicates a page and a position on the page for the corresponding portion.

31. A non-transitory computer readable medium, according to claim 30, wherein the position on the page is descriptive.

32. A non-transitory computer readable medium, according to claim 30, wherein the position on the page is indicated using a graphical matrix.

\* \* \* \* \*